March 20, 1928.  1,663,287
A. VOLENCE
COW TAIL HOLDER
Filed May 17, 1924
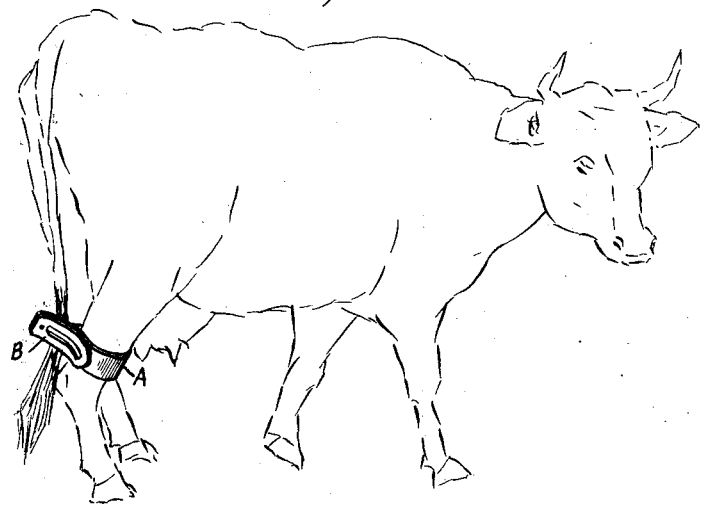
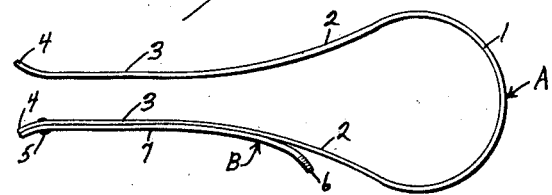
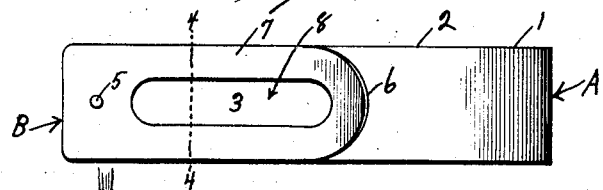
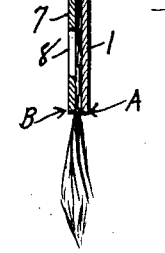
Inventor
Anthony Volence Patented Mar. 20, 1928.

1,663,287

UNITED STATES PATENT OFFICE.

ANTHONY VOLENCE, OF BROWERVILLE, MINNESOTA.

COW-TAIL HOLDER.

Application filed May 17, 1924. Serial No. 714,122.

The present invention relates to improvements in cow tail holders having for its prime object to provide a very simple and efficient structure which is reliable in use, inexpensive to manufacture, light, durable, strong, and well adapted to the purpose for which it is designed.

A further object of the invention is to provide a cow tail holder of this nature which may be supported on the leg of the animal having means for engaging the animal's tail so as to prevent wagging thereof during milking, the device being capable of being engaged on the animal very readily and quickly.

With the above and other objects in view as will appear as the description progresses, the invention resides in certain novel features of construction, and in the combination and arrangement of parts as will be hereinafter more fully described and claimed.

In the drawing:

Figure 1 is a perspective view of the cow tail holder showing the same as positioned on an animal, Figure 2 is an edge elevation of the device, Figure 3 is a side elevation thereof, and Figure 4 is a detail section taken substantially on the line 4—4 of Figure 3.

Referring to the drawing in detail it will be seen that the device consists generally of a leg engaging element A and a tail engaging element B. The leg engaging element presents a substantial U-shaped formation as is illustrated to advantage in Figure 2 so as to provide a semi-annular intermediate portion 1 terminating in portions 2 converging towards each other so as to terminate in the substantially parallel leg portions 3 the ends of which are bent outwardly so as to diverge from each other as at 4. This leg engaging element formed of resilient material preferably from some sheet metal so that the legs 3 may be spread from each other so that the element A may be engaged over the leg as is indicated to advantage in Figure 1 with the diverging terminals 4 extending rearwardly.

The tail engaging element B is also formed of resilient material such as sheet metal and is riveted or otherwise fastened as at 5 to one end of one of the leg portions 3 so as to lie alongside thereof. This tail engaging element is in the form of a plate having its free edge 6 bent outwardly from the portion 2 of leg 3 to which it is attached and also rounded as is seen to advantage in Figure 3. The body 7 of the plate is provided with a longitudinally extending slot 8 so that when the end of the tail of the animal is engaged between the body 7 and the leg 3 to which it is attached it will be prevented from being too easily jerked away from the holder as will be appreciated from an inspection of Figure 4.

Although I have described my invention with a certain degree of particularity, it is to be understood that changes in the details of construction may be resorted to without departing from the spirit or scope of the invention as hereinafter claimed or sacrificing any of its advantages.

Having thus described my invention, what I claim as new is:

As a new article of manufacture, a cow tail holder comprising a clamp of substantially U-shape in plan constructed from a relatively wide thin strip of resilient metal including an intermediate semi-circular body portion having its ends arranged in converging relation and a pair of elongated resilient legs disposed in parallel relation on said ends defining a restricted neck entrance leading to the semi-circular body portion, the free terminals of the legs being flared outwardly, and a flat resilient plate disposed in abutting relation to the outer face of one of said legs having its opposite ends bent outward away from said legs, the outer flared end of said plate engaging the flared terminal of the mentioned resilient leg and secured thereto, the inner flared end of said plate terminating adjacent to the semi-circular body portion and diverging therefrom.

In testimony whereof I affix my signature.

ANTHONY VOLENCE.